(12) United States Patent
Broll et al.

(10) Patent No.: US 10,013,312 B2
(45) Date of Patent: Jul. 3, 2018

(54) METHOD AND SYSTEM FOR A SAFE ARCHIVING OF DATA

(71) Applicant: International Business Machines Corporation, Armonk, NY (US)

(72) Inventors: Bjoern Broll, Waldenbuch (DE); Claus Kempfert, Altdorf (DE); Oliver Koeth, Stuttgart (DE); Laura M. Kunioka-Weis, Morgan Hill, CA (US); Knut Stolze, Jena (DE)

(73) Assignee: International Business Machines Corporation, Armonk, NY (US)

(*) Notice: Subject to any disclaimer, the term of this patent is extended or adjusted under 35 U.S.C. 154(b) by 935 days.

(21) Appl. No.: 14/495,412

(22) Filed: Sep. 24, 2014

(65) Prior Publication Data
US 2015/0142749 A1 May 21, 2015

(30) Foreign Application Priority Data

Nov. 19, 2013 (GB) .................................. 1320442.5

(51) Int. Cl.
*G06F 7/00* (2006.01)
*G06F 17/30* (2006.01)
*G06F 11/14* (2006.01)

(52) U.S. Cl.
CPC .... *G06F 11/1451* (2013.01); *G06F 17/30073* (2013.01); *G06F 17/30289* (2013.01); *G06F 17/30575* (2013.01)

(58) Field of Classification Search
CPC ........... G06F 11/1451; G06F 17/30073; G06F 17/30289; G06F 17/30575
See application file for complete search history.

(56) References Cited

U.S. PATENT DOCUMENTS

| | | | |
|---|---|---|---|
| 6,665,779 B1* | 12/2003 | Polfer | G06F 11/1451 711/112 |
| 6,772,155 B1* | 8/2004 | Stegelmann | G06F 17/30362 |
| 8,032,493 B2 | 10/2011 | Gong | |
| 8,452,730 B2 | 5/2013 | Pederson et al. | |

(Continued)

FOREIGN PATENT DOCUMENTS

| | | |
|---|---|---|
| CN | 1848090 A | 10/2006 |
| CN | 101076801 A | 11/2007 |

(Continued)

OTHER PUBLICATIONS

Watson, J; "12C: In Database Archiving"; http://www.orafaq.com/node/2824; Jul. 28, 2013.

*Primary Examiner* — Taelor Kim
(74) *Attorney, Agent, or Firm* — North Shore Patents, P.C.; Michele Liu Baillie

(57) ABSTRACT

A method for archiving a predefined portion of a table residing in a database system includes: creating a first backup copy of the portion of the table; assigning to the portion of the table an access state flag; setting the access state flag; using the access state flag for preventing modification of existing backup copies of the portion of the table and for preventing further backup operations on the portion of the table; archiving the portion of the table to a separate system; deleting the content of the portion of the table from the database system and retaining the access state flag in the database system.

10 Claims, 4 Drawing Sheets

(56) References Cited

U.S. PATENT DOCUMENTS

| | | | |
|---|---|---|---|
| 2002/0053044 A1* | 5/2002 | Gold | G06F 11/1417 714/6.24 |
| 2006/0101094 A1 | 5/2006 | Fischer et al. | |
| 2008/0229037 A1* | 9/2008 | Bunte | G06F 11/1451 711/162 |
| 2009/0083341 A1 | 3/2009 | Parees et al. | |
| 2010/0211549 A1 | 8/2010 | Shetty et al. | |
| 2012/0084316 A1* | 4/2012 | Koenig | G06F 17/30545 707/769 |
| 2012/0084523 A1* | 4/2012 | Littlefield | G06F 11/1469 711/162 |
| 2013/0007389 A1 | 1/2013 | Patterson et al. | |
| 2013/0066833 A1 | 3/2013 | Aikas et al. | |

FOREIGN PATENT DOCUMENTS

| | | |
|---|---|---|
| WO | 2012008951 A1 | 1/2012 |
| WO | 2013123831 A1 | 8/2013 |
| WO | 2014047736 A1 | 4/2014 |

* cited by examiner

METHOD AND SYSTEM FOR A SAFE ARCHIVING OF DATA

BACKGROUND

Field of the Invention

The invention relates to computing systems, and more particularly to a method for a safe archiving of data.

Background

The amount of data stored and processed by database systems are growing at an accelerating pace. Storing billions of database records has impact on disk space that is required to store this data. This disk space may be expensive for high-quality storage like z/OS storage servers. In addition, storing billions of records in a database system might affect the performance of the database system.

Therefore, less frequently changed data and/or less frequently used data might be subject to be moved ("archived") to cheaper storage or systems.

The process of moving data from one location to another (e.g. to another database system), will be called "archiving" in this invention.

Common to almost all known "archiving" solutions is that the data is moved into an archive system and afterwards the data is purged from the source system. However, this data separation leads to data maintenance issues on the source system.

SUMMARY

It is an objective of embodiments of the invention to provide for an improved method, a computer system and a computer program product for safe archiving of data. Said objective is solved by the subject matter of the independent claims. Advantageous embodiments are described in the dependent claims.

In one aspect, the invention relates to a computer implemented method for archiving a predefined portion of a table residing in a database system. The method comprises: creating a first backup copy of the portion of the table; assigning to the portion of the table an access state flag; setting the access state flag; using the access state flag for preventing modification of existing backup copies of the portion of the table and for preventing further backup operations on the portion of the table; archiving the portion of the table to a separate system; deleting the content of the portion of the table from the database system and retaining the access state flag in the database system.

These features may provide a secure method for archiving data by preventing data loss using protected backup copies that has been created before deleting the data in the source system. That is, the data may be restored in the database system in case the archive system fails or data modifications to the archived data are needed. This may, in addition, save resources (e.g. processing powers) that would otherwise be required when restoring the data from the archive system.

The modification of the portion of the table comprise the insertion of new data in the portion of the table or update (overwrite) of exiting data in the portion of the table or a deletion of the content of the portion of the table.

The present method may allow the creation of multiple archives using a same single data source (i.e. from the first backup copy). This is in contrast to the conventional methods that provide multiple archives based on respective multiple data sources. This is because, the archiving of data is followed by a deletion of the data source and thus a further archive operation with the conventional method may first require the recovery of the deleted data source. As a result, the present method may further save resources and prevent data inconsistency between multiple archives that may happen when handling multiple sources of the same data.

For example, the existing backup copies comprise at least the last backup copy of the portion of the table.

According to one embodiment, the method further comprises repeating archiving step at least twice using the first backup copy for the portion of the table. This may provide multiple archived copies of the same portion of the table using the first backup copy.

According to one embodiment, the method further comprises receiving a query for the portion of the table that should return data of the portion of the table of the source system (i.e. no archived data); using the access state flag for returning an empty result in response to the received query. The query may comprise, for example, a Structured Query Language (SQL) or Multidimensional Expressions (MDX) query, or it may alternatively conform to any other suitable format or language.

Since the portion of the table has been pruned from the database system, the mere existence of the access state flag may suffice as indicator that no data exists and nothing has to be scanned. Hence, query processing may benefit (e.g. from less required resources) because the file for the portion of the table space may not have to be opened, and no internal meta data (free space map, indexes, page information, etc.) has to be loaded and interpreted.

According to one embodiment, the first backup copy has a first identifier determined using a first identification algorithm. The method further comprises: after creating the first backup copy of the portion of the table and after setting the access state flag, determining if a second backup copy of the portion of the table having a second identifier determined using a second identification algorithm was created, wherein in case the second backup copy was created creating a third backup copy of the portion of the table having a third identifier that is determined using the first identification algorithm.

The third backup copy becomes the last backup copy of the portion of the table, and thus, the method described below for the first backup copy (i.e. as the last backup copy) holds true for the third backup copy.

This embodiment may be advantageous as it may strengthen the safety aspect of the present method by preventing the usage of different identification algorithms for backup copies of archived data.

According to one embodiment, the method further comprises using the access state flag for preventing modification of the portion of the table. This may be advantageous as no new records can be inserted into the portion of the table which would not be reflected in the archived data.

According to one embodiment, the method further comprises: unsetting the access state flag before deleting the content of the portion of the table from the database system; and resetting the access state flag after deleting the content of the portion of the table from the database system.

According to one embodiment, the method further comprises: after deleting the content of the portion of the table from the database system: determining that the portion of the table was unmodified by an operation excluding the deleting of the content of the portion of the table from the database system after creating the first backup copy of the portion of the table; determining that the first backup copy is the last backup copy of the portion of the table, and ending the method successfully.

For example, there may be other operations than the deleting of the content of the portion of the table from the database system operation of the present disclosure that may modify the portion of the table. The step of determining whether the portion of the table was unmodified may be performed by checking whether the portion of the table was modified by such other operations.

According to one embodiment, the method further comprises: after resetting the access state flag: determining that the portion of the table was unmodified by an operation excluding the deleting of the content of the portion of the table from the database system after creating the first backup copy of the portion of the table; determining that the first backup copy is the last backup copy of the portion of the table, and ending the method successfully.

This may provide a consistency check method without having to compare the backup data with the archived data.

According to one embodiment, the method further comprises: after resetting the access state flag: determining that the portion of the table was unmodified by an operation excluding the deleting of the content of the portion of the table from the database system after creating the first backup copy of the portion of the table determining that the first backup copy is invalid in response to a determination that a second later backup copy of the portion of the table exists; unsetting the access state flag; restoring the portion of the table using the first backup p copy; and rerunning the creating of the first backup copy of the portion of the table, the assigning to the portion of the table the access state flag; the setting of the access state flag; the use of the access state flag for preventing modification of the existing backup copies of the portion of the table and for preventing further backup operations on the portion of the table; the archiving of the portion of the table to the separate system; and the deleting of the content of the portion of the table from the database system and the retaining of the access state flag in the database system, thereby creating a new backup copy.

Since the access state flag may be used to protect the last created backup copy that is stored in the database system; this embodiment may prevent that other backup copies (e.g. the second backup copy using other identification algorithms) than the ones created in accordance with the present disclosure (e.g. using the first identification algorithm) are protected by the access state flag. Protecting the last backup copy only may be advantageous as it may allow deletion of old backup copies, and thus, saving storage resources.

According to one embodiment, the method further comprises: after resetting the access state flag: in response to a determination that the portion of the table was modified by an operation excluding the deleting of the content of the portion of the table from the database system after creating the first backup copy of the portion of the table, determining a modification to the portion of the table using statistical data associated to the portion of the table, unsetting the access state flag; restoring the portion of the table using the first backup copy, applying the determined modification to the portion of the table and re-running the creating of the first backup copy of the portion of the table, the assigning to the portion of the table the access state flag; the setting of the access state flag; the use of the access state flag for preventing modification of the existing backup copies of the portion of the table and for preventing further backup operations on the portion of the table; the archiving of the portion of the table to the separate system; and the deleting of the content of the portion of the table from the database system and the retaining of the access state flag in the database system for the modified portion of the table.

For example, in case the delete is not possible with the access state flag being set. Then unsetting it is required before deleting the content of the portion of the table from the database system can be performed. Meanwhile data modification might occur. This would be detected and handled in the scope of the above embodiment.

According to one embodiment, the method further comprises: after deleting the content of the portion of the table from the database system: determining that the portion of the table was unmodified by an operation excluding the deleting of the content of the portion of the table from the database system after creating the first backup copy of the portion of the table; determining that the first backup copy is invalid in response to a determination that a second later backup copy of the portion of the table exists; restoring the portion of the table using the first backup copy; and rerunning the creating of the first backup copy of the portion of the table, the assigning to the portion of the table the access state flag; the setting of the access state flag; the use of the access state flag for preventing modification of the existing backup copies of the portion of the table and for preventing further backup operations on the portion of the table; the archiving of the portion of the table to the separate system; and the deleting of the content of the portion of the table from the database system and the retaining of the access state flag in the database system thereby creating a new backup copy.

According to one embodiment, the method further comprises: after deleting the content of the portion of the table from the database system: in response to a determination that the portion of the table was modified by an operation excluding the deleting of the content of the portion of the table from the database system after creating the first backup copy of the portion of the table, determining a modification to the portion of the table using statistical data associated to the portion of the table; restoring the portion of the table using the first backup copy; applying the determined modification to the portion of the table and re-running the creating of the first backup copy of the portion of the table, the assigning to the portion of the table the access state flag; the setting of the access state flag; the use of the access state flag for preventing modification of the existing backup copies of the portion of the table and for preventing further backup operations on the portion of the table; the archiving of the portion of the table to the separate system; and the deleting of the content of the portion of the table from the database system and the retaining of the access state flag in the database system, for the modified portion of the table.

According to one embodiment, the deleting is performed by a deletion module of the database system. The method further comprises controlling the deletion module to delete the portion of the table independent of the access state flag being set or not.

This embodiment may be seamlessly integrated in the existing systems as it may have few or no technical constraints for ignoring the access state flag. This is because, there is no need to revoke the access state flag and thus no need to check if the portion of the table was modified or the first backup copy was invalidated.

According to one embodiment, the creation of a first backup copy is performed by a backup module of the database system, the method further comprising controlling the backup module to include the steps a, b and c as an atomic operation. This may be advantageous as it may prevent modifications to the portion of the table as well as prevent new backup copies from being taken that might otherwise happen before setting the access stat flag.

According to one embodiment, the method further comprises receiving a request to restore the portion of the table; unsetting the access state flag; and restoring the portion of the table using the first backup copy.

According to one embodiment, the method further comprises receiving data indicative of an intrusion attempt to the portion of the table; using the access state flag for preventing access to the first backup copy and the archived data. The intrusion to the portion of the table may be, for example, an unauthorized gain of root level access and the resulting steal of information. The forbidden access to the portion of the table may only concern the intruder who is trying the intrusion attempt (e.g. other authorized users may access the portion of the table while the intruder is blocked from access). The method may further comprise sending an access error message to the intruder. This embodiment may be advantageous as it may strengthen the safety aspect of the present method by providing a user dependent access state flag.

In another aspect, the invention relates to a computer program product comprising computer executable instructions to perform the method steps of the method of any one of the preceding embodiments.

In another aspect, the invention relates to database system for archiving a predefined portion of a table residing in the database system, the database system comprising: a backup module being operable for creating a first backup copy of the portion of the table, assigning to the portion of the table an access state flag, setting the access state flag, using the access state flag for preventing modification of existing backup copies of the portion of the table and for preventing further backup operations on the portion of the table; an archiving module being operable for archiving the portion of the table to a separate system; a deletion module being operable for deleting the content of the portion of the table from the database system and retaining the access state flag in the database system.

It is understood that one or more of the aforementioned embodiments may be combined as long as the combined embodiments are not mutually exclusive.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

The present disclosure addresses the shortcoming of data archiving methods for which archived data as well as associated backup copies may not be protected e.g. against data loss. For example, if data is archived based on some criteria, e.g. archive specific partitions, the database system may not enforce and guarantee that no new records satisfying the criteria of the portion of the table (e.g. partition) are added—or existing records changed in such a way that they now satisfy the criteria. Also, the backup images may not be protected as they may be regularly and automatically deleted, for example, if they reach a certain threshold (e.g. number of days).

Introducing a table space/partition state and integrating it in affected database operations may prevent new data from being inserted into archived partitions of a table, may prevent creation of new backup images and may prevent purging of most recent n backup images.

Figure 1:
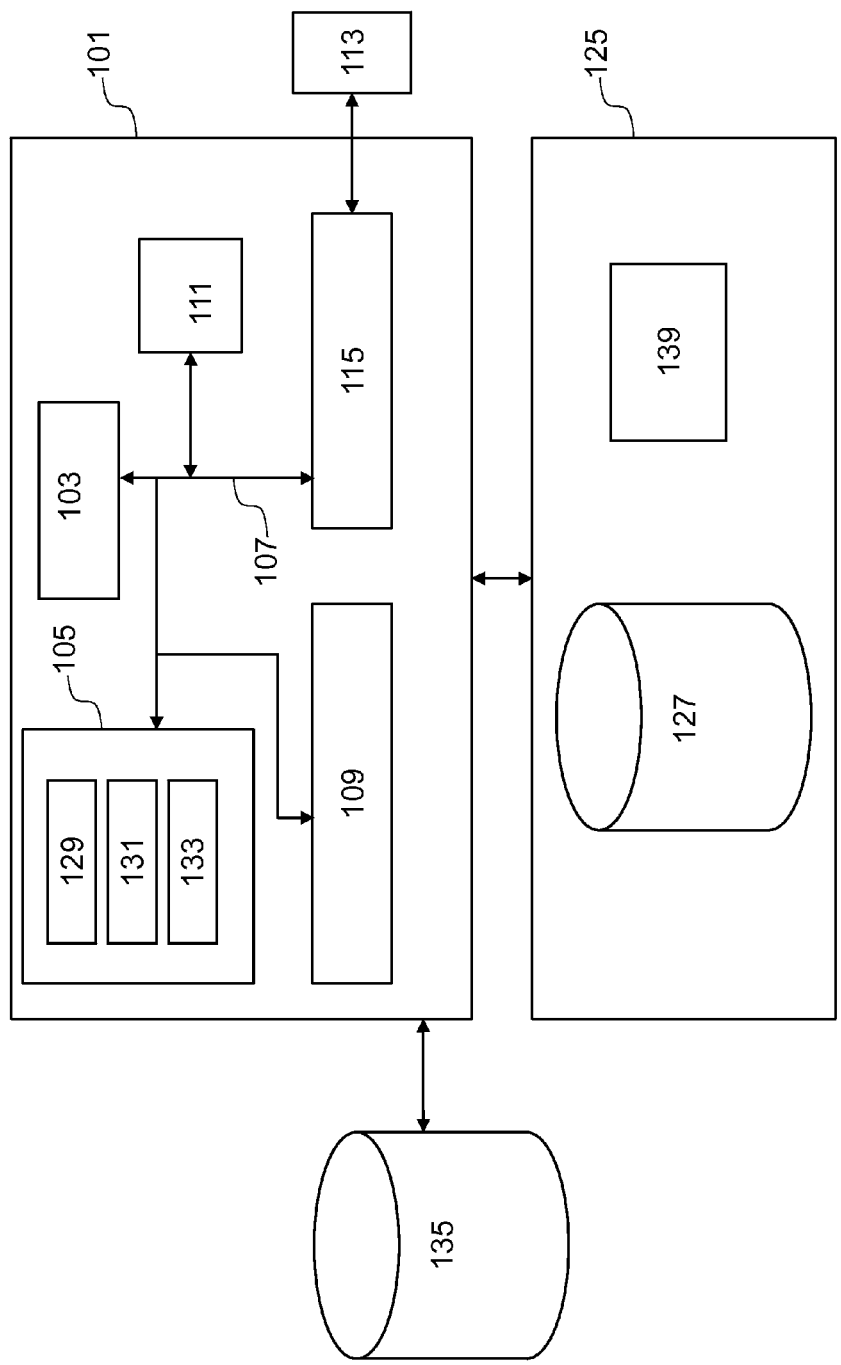
FIG. 1 illustrates a database system operable to execute method for archiving data.

FIG. 1 depicts exemplary database system 100 for a data archiving process. For example, the database system 100 may be part of a zEnterprise system of IBM® comprising an IBM DB2 database system.

The database system 100 provides a computer system 101. The components of computer system 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as a keyboard, a pointing device, a display 113, etc.; one or more devices that enable a user to interact with computer system 101; and/or any devices (e.g., network card, modem, etc.) that enable computer system 101 to communicate with one or more other computing devices. Such communication can occur via I/O interface(s) 115. Still yet, computer system 101 can communicate with one or more networks such as a local area network (LAN), a general wide area network (WAN), and/or a public network (e.g., the Internet) via network adapter 109. As depicted, network adapter 109 communicates with the other components of computer system 101 via bus 107.

The computer system 101 may act as a database management server system connected to a database infrastructure 125. The computer system 101 may include and implement a database management system. The database infrastructure 125 comprises a source database 127. The database infrastructure 125 may, for example, comprise a cache 139. The content of the cache 139 may provide insight on which database objects of the source database 127 are frequently used and have been recently used. This may help, for example, to decide on which data to be archived. The database system 100 further comprises a target database 135. Alternatively, the database 135 may be an external and/or an independent resource of the database system 100 (in this case the database system 100 may be connected to the target database 135). The target database 135 is adapted to store archived data. The target database 135 may be part of an accelerator server system (not shown). For example, the accelerator server system may be implemented by an IBM Netezza system that is integrated with IBM DB2 for z/OS and serves as an IBM DB2 Analytics Accelerator (IDAA). The accelerator server system may provide superior query performance when the archived data is accessed in at least read-only manner. The data stored in the target database 135 may be queried directly e.g. via SQL.

The source database 127 may be an internal resource of the computer system 101 while the target database 135 may be an external and/or an independent resource of the computer system 101.

Memory system 105 is configured to store applications that are executable on the processor 103. For example, the memory system 105 may comprise an operating system as well as application programs. For example, the application programs comprise a backup module 129, archive module 131 and deletion module 133.

The backup module 129 uses the storage device 111 as a backup storage device. The storage device 111 may be an internal or external resource of the computer system 101, or a combination of the two. Any number of local and/or external storage devices may be used by the backup module 129 for storing backup data.

The archive module 131 may use, for example, the content of the cache 139 to determine which data stored in the source database 127 may be archived in the target database 135. The archive module 131 may archive said data in the target database 135.

The deletion module 133 may delete obsolete and/or less frequently used data from the source database 127.

The backup, archive and deletion module may be part of the implemented database management system.

The operation of the database system 100 will be described in details with reference to FIG. 2-4.

Figure 2:
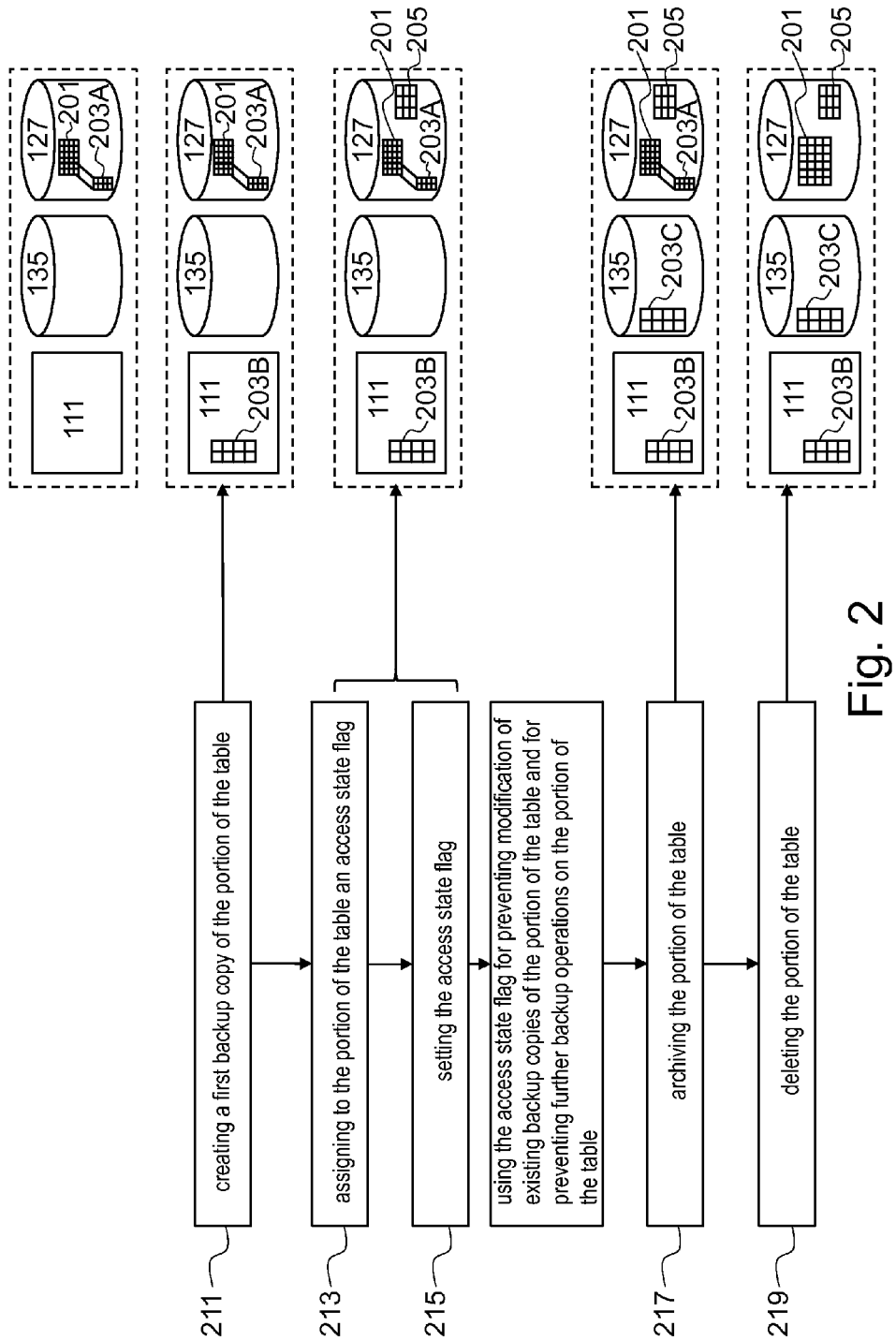
FIG. 2 is a flowchart of an exemplary method for archiving data in accordance with the present disclosure.

FIG. 2 is a flowchart of an exemplary method for archiving data in accordance with the present disclosure. FIG. 2 shows the source database 127 as containing a data table 201. The data table 201 may comprise, for example, operational data that may be used for subsequent operations on the database system 100. The data table 201 comprises a portion 203A.

For simplicity of the description, only one simple table and a single portion of that table is described; however, the skilled person in the art will easily understand that the present method may be generalized to more than one table and more than one portion per table.

The portion of the table 203A may comprise outdated data and/or less frequently used data. The portion of the table 203A may be defined by a user of the database system 100 who wishes to archive the portion of the table 203A into the target database 135. For that, the computer system 101 may receive from the user a selection of the portion of the table 203A, for example, via the I/O interface 115. Alternatively, the portion of the table 203A may be automatically selected by the computer system 101 by using, for example, the frequency access (by a single or multiple users) to the portion of the table 203A and/or the last modification date of the portion of the table 203A. For example, if the frequency access to the portion of the table 203A is below a predefined threshold the computer system 101 may decide to archive the portion of the table 203A.

In step 211, the backup module 129 may create a first backup copy 203B of the portion of the table 203A. The first backup copy 203B may be stored in the storage device 111. The storage device 111 may comprise multiple storage tiers having different performance characteristics. The performance characteristics may be for example I/O response time and/or I/O throughput and/or a combination thereof. The storage tiers may be ranked or classified based on their performance characteristics. For example, the first ranked storage tier may have the lowest I/O response time. The first backup copy 203B may be stored in the first ranked storage tier during a first time period (e.g. one week after the creation of the first backup copy 203B). The first backup copy 203B may be stored in the second ranked storage tier during a second time period that follows the first time period. This may be advantageous as the first backup copy 203B may be more frequently used during the first time period than in the second time period, and thus, a better performing storage tier may be needed during the first time period. Alternatively, the storage device 111 may be realized with slower hard disk storage. This may be advantageous as it may provide a cheaper storage device that may be used, in particular when the frequency access to the first backup copy 203B is small. The backup module 129 may comprise an identification algorithm, wherein the identification algorithm may assign to the first backup copy 203B a first identifier. The first identifier may comprise a unique name of the first backup copy 203B and/or a timestamp at which the first backup copy 203B was created. The first backup copy 203B may be time-stamped to designate the chronological order by which it was stored in the storage device 111.

In step 213, an access state flag may be assigned to the portion 203A of the table. The access state flag may be stored in the source database 127. This may be done, for example, by adding meta-data to table 205 that stores the access state flags in accordance with the present disclosure. The meta-data may indicate the portion of the table 203A and the status of the associated access state flag. For example, the access state flag may be a binary flag e.g. boolean flag and the status of access state flag may be a true or false status. Alternatively, the access state flag may comprise a plurality of bits. Each bit may be assigned to a status of the access status flag. For example, setting a first bit (e.g. to value 1) of the plurality of bits may prevent modification of existing backup copies of the portion of the table 203A and for preventing further backup operations on the portion of the table 203A. Setting a second bit (e.g. to value 1) of the plurality of bits may prevent modification of the portion of the table 203A.

Other database flags may be used for controlling access to the portion of the table (in parallel to the access state flag). Those other flags may be "Only Utility Operations are allowed", "Read-Only", "Utility Operations required", "Utility Operations recommended" flag. In this case, the first backup copy 203B may be protected by the access stat flag while the portion of the table 203A may be protected using the other database flags and the access state flag.

The access state flag may be integrated in affected database operations that use the portion of the table 203A. For example, in case computer system 101 is implementing an SQL database management system the INSERT, UPDATE or MERGE SQL statements may be configured to take into account the access state flag when accessing the portion of the table 203A.

In case the computer system 101, in another example, is implementing a DB2 database management system, various utilities, which operate on the physical representation of the portion of the table 203A in the source database 127, like REORG, COPY, RUNSTATS and RESTORE may be configured to take into account the access state flag. For example, RUNSTATS may work on the portion of the table 203A as read-only data and collect statistics when the access state flag is set. REORG may fail when accessing the portion of the table 203A because no changes to the portion of the table 203A may be allowed when the access set flag is set and when the access state flag is used to prevent modification of the portion of the table 203A. Likewise, loading new data into the portion of the table 203A may fail.

In step 215, the access state flag may be set, for example, by setting the boolean status to "true" in the table 205 (or setting the first bit to 1). When set to "true", the backup module 129 may use the status of the access state flag for preventing modification of existing backup copies of the portion of the table 203A and for preventing further backup operations on the portion of the table 203A.

For example, the backup module 129 may be configured to execute steps 211 to 215 as an atomic operation.

After step 215, the backup module 129 may determine (or check) if a second backup copy of the portion of the table 203A having a second identifier (i.e. with a most recent time-stamp) was created before setting the access state flag. The second identifier is determined using a second identification algorithm. And, in case the second backup copy exists, a third backup copy of the portion of the table is created and a third identifier is assigned to the created third backup copy. The third identifier may be determined using the first identification algorithm. The first identification algorithm may be a Globally Unique Identifier (GUID) algorithm. The first identification algorithm may use a predefined naming scheme for identifying the first backup copy 203B. For example, the first identification algorithm may identify the first backup copy 203B using a name that contains a timestamp at which the first backup copy 203B was created and a unique prefix that is just used for archived data. Said predefined naming scheme may be used for identifying the third backup copy. This may prevent the unintentional usage of a second backup copy that may be different from the first backup copy (e.g. by using a different identification algorithm).

In step 217, the archive module 131 may archive the portion of the table 203A into the target database 135 resulting in an archived copy 203C of the portion of the table 203A.

Any attempts to insert data sets into an archived copy 203C may fail with a respective error message. However, the computer system 101 may still query the archived copy 203C, so that for example table scans do not fail.

In step 219, the deletion module 133 may delete the content of the portion of the table 203A while retaining the access state flag. For example, in case the access state flag is also used to prevent modification of the portion of the table 203A (i.e. When the access state flag is set, the modification of the portion of the table 203A is prohibited), the deletion module 133 may delete the portion of the table 203A independent of the access state flag being set or not (i.e. the deletion module may be configured to ignore the status of the access state flag during the archiving process).

If the access state flag is set, requests for new backups of the portion of the table 203A may be ignored or fail with an error. This is because, the first backup copy 203B with the now-archived data (203C) still exists and is valid, i.e. it holds the data for recovery purposes. New backups would be empty and would thus be useless.

After deleting step 219, it is determined that the portion of the table 203A was unmodified by an operation excluding the deleting step 219 after creating step 211 and if the first backup copy 203B is still valid, the method ends successfully. A valid backup copy may be a non-corrupted backup copy that it is the last backup copy being created for the portion of the table 203A.

As important as preventing the creation of new backup images is the requirement to retain the backup image containing the archive data. The database system may manage all backup images and, for example implicitly or explicitly deletes old backup images based on some criteria. The algorithm responsible for that may be configured to consider the access state flag. If that access state flag is found, the last backup image (or the last "n" backup images) may not be deleted.

Figure 3:
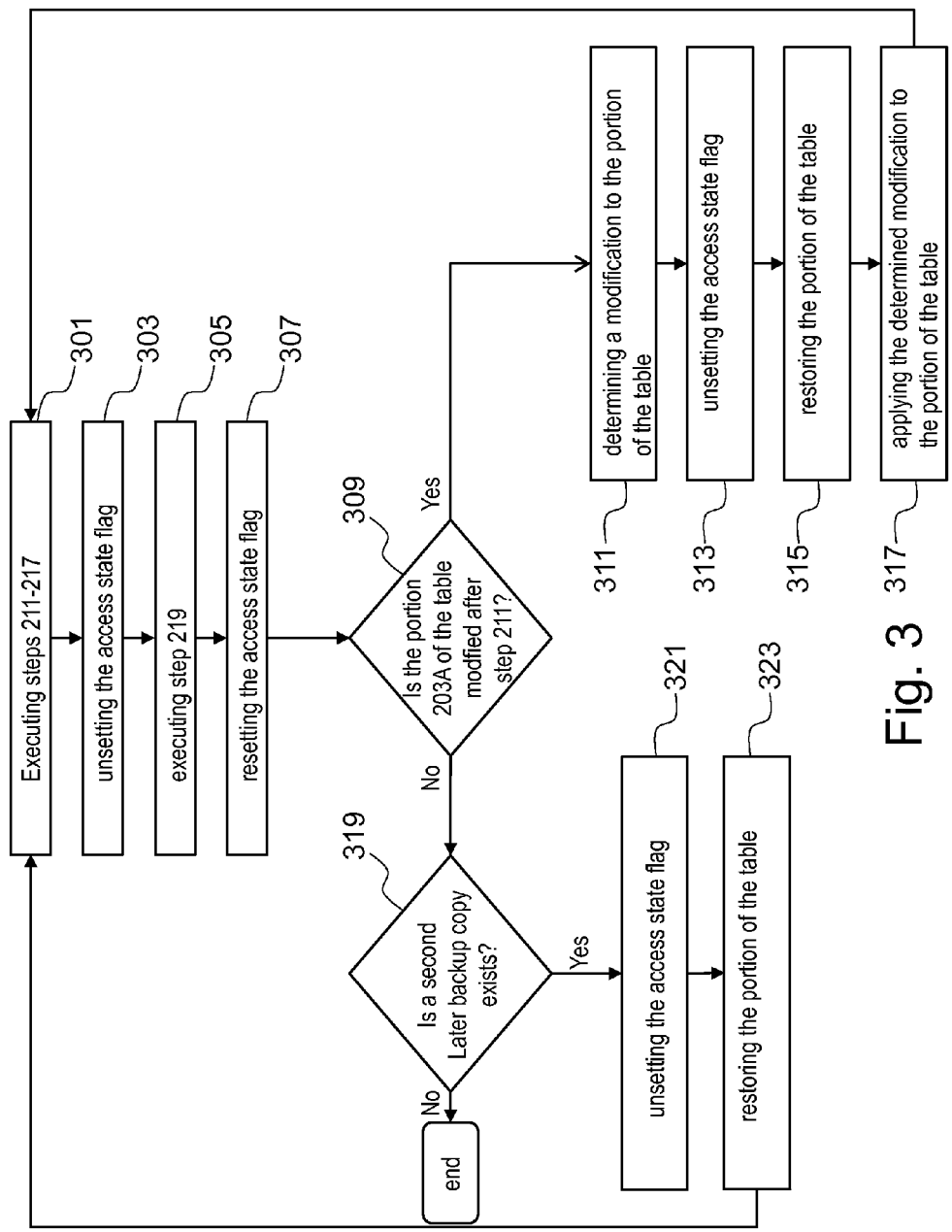
FIG. 3 is a flowchart of another exemplary method for archiving data in accordance with the present disclosure.

FIG. 3 is a flowchart of an exemplary method for archiving the portion of the table 203A. In this exemplary method, the access state flag is used to prevent modification of the portion of the table 203A as well.

In step 301, the steps 211-217 are executed. In step 303, the access state flag is unset (e.g. by switching the access state flag status to "false" in the table 205 or setting the first bit value to 0) before deleting step 219 that is executed in step 305. In step 307, the access state flag is reset.

In step 309, it is determined whether the portion 203A of the table was modified by an operation excluding the deleting step 219 after step 211. This may be done by using for example historical data (e.g. by using the log) to determine whether new data have been inserted into the portion of the table or updates have been made to the content of the portion of the table before it is deleted or a deletion of the content of the portion of the table is made by another operation than the deleting step 219 e.g. a deletion operation by another application that may happen before the deleting step 219 of the present disclosure. The modification may happen when the access state flag is unset.

In case the portion of the table was modified by an operation excluding the deleting step 219 after step 211, a modification to the portion 203A of the table is determined in step 311. This may be done, for example, using the statistical data associated with the portion of the table 203A. The statistical data may be obtained in the case of DB2 using the Real Time Statistics (RTS).

In step 313, the access state flag is unset so as to restore the portion of the table in step 315. In step 317, the determined modification is applied to the portion of the table. The steps are repeated on the modified portion of the table.

In case the portion of the table was unmodified after step 211, it is determined in step 319 whether a second later backup copy exists. If the second backup copy exists, the access state flag is unset in step 321, the portion of the table is restored using the first backup copy 203B (step 323) and the steps of the method are repeated for creating a new backup copy. If the second backup copy does not exist, the method ends successfully.

Figure 4:
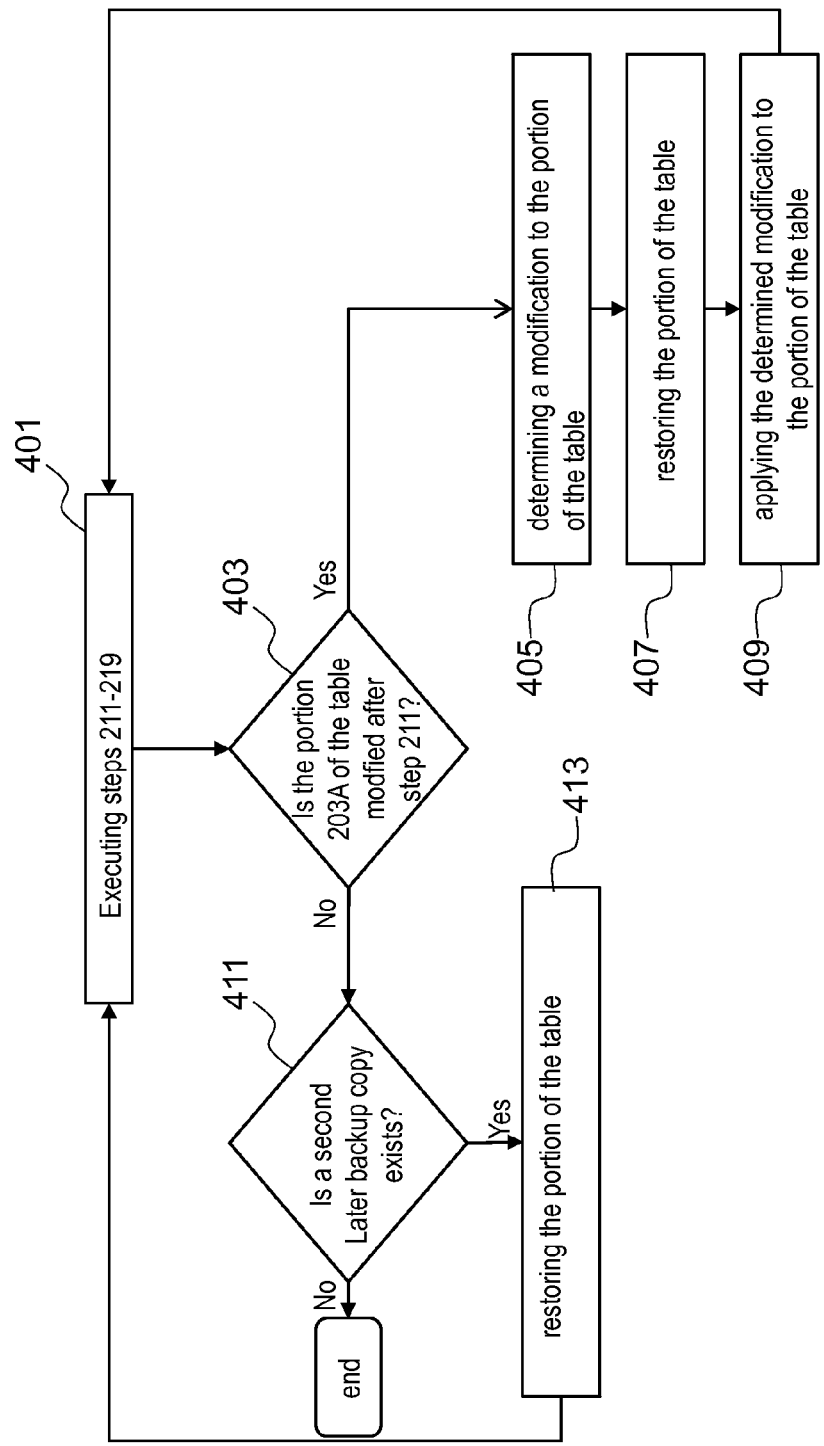
FIG. 4 is a flowchart of a further exemplary method for archiving data in accordance with the present disclosure.

FIG. 4 is a flowchart of an exemplary method for archiving the portion 203A of the table. In this exemplary method, the access state flag is not used to prevent modification of the portion 203A of the table as well.

In step 401, the steps 211-219 are executed. In step 403, it is determined whether the portion 203A of the table was modified by an operation excluding the deleting step 219 after step 211.

In case the portion of the table was modified by an operation excluding the deleting step 219 after step 211, a modification to the portion 203A of the table is determined in step 405. This may be done, for example, using the statistical data associated with the portion of the table.

In step 407, the portion of the table is restored using the first backup copy. In step 409, the determined modification is applied to the restored portion of the table. The steps of the method are repeated on the modified portion of the table.

In case the portion of the table was unmodified after step 211, it is determined in step 411 whether a second later backup copy exists. If the second backup copy exists, the portion of the table is restored using the first backup copy in step 413 and the steps of the method are repeated for creating a new backup copy. If the second backup copy does not exist, the method ends successfully.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

LIST OF REFERENCE NUMERALS 100 database system
101 computer system
103 processor
105 memory
107 bus
109 network adapter
111 storage system
113 display
115 I/O interface
125 database infrastructure
127 source database
129 backup module
131 archive module
133 deletion module
135 target database
139 cache
201, 205 table
203A portion of the table
203B first backup copy
203C archived copy.

What is claimed is:

1. A computer implemented method for archiving a portion of a table residing in a database system, the method comprising:
creating a first backup copy of the portion of the table and assigning a first identifier to the first backup copy using a first identification algorithm;
assigning to the portion of the table an access state flag;
in response to the creation of the first backup copy, setting the access state flag assigned to the portion of the table, wherein the access state flag is used for preventing modification of the first backup copy of the portion of the table and for preventing further backup operations on the portion of the table after the access state flag is set;
archiving and deleting the content of the portion of the table from the database system and retaining the access state flag in the database system;
determining a second backup copy of the portion of the table was created and assigned a second identifier using a second identification algorithm after the first backup copy was created and before the setting of the access state flag assigned to the portion of the table;
in response to determining that the second backup copy was created, unsetting the access state flag assigned to the portion of the table and creating a third backup copy of the portion of the table using the first backup copy, and assigning a third identifier to the third backup copy using the first identification algorithm; and
in response to the creation of the third backup copy, resetting the access state flag assigned to the portion of the table.

2. The method of claim 1, further comprising:
unsetting the access state flag before deleting the content of the portion of the table from the database system; and
resetting the access state flag after deleting the content of the portion of the table from the database system.

3. The method of claim 1, further comprising after deleting the content of the portion of the table from the database system:
determining that the portion of the table was unmodified by an operation excluding the deleting of the content of the portion of the table from the database system after creating the third backup copy of the portion of the table;
determining that the third backup copy is the last backup copy of the portion of the table, and ending the method successfully.

4. The method of claim 3, further comprising:
determining that the portion of the table was unmodified by an operation excluding the deleting of the content of the portion of the table from the database system after creating the third backup copy of the portion of the table;
determining that the third backup copy is invalid in response to a determination that a fourth later backup copy of the portion of the table exists, the fourth later backup copy created before the resetting of the access state flag;
unsetting the access state flag;
restoring the portion of the table using the third backup copy;
creating a new backup copy of the portion of the table;
reassigning to the portion of the table the access state flag;
resetting the access state flag; and
archiving and deleting the content of the portion of the table from the database system and retaining the access state flag in the database system.

5. The method of claim 4, further comprising:
in response to a determination, after creating the third backup copy of the portion of the table, that the portion of the table was modified by an operation excluding the deleting of the content of the portion of the table from the database system, the determining of the modification to the portion of the table using statistical data associated with the portion of the table, the modification occurring before the deletion of the content of the portion of the table,
unsetting the access state flag;
restoring the portion of the table using the third backup copy,
applying the determined modification to the portion of the table;
creating a fourth backup copy of the modified portion of the table;
assigning to the modified portion of the table the access state flag;
setting the access state flag, wherein the access state flag is used for preventing modification of the fourth backup copy of the modified portion of the table and for preventing further backup operations on the modified portion of the table; and archiving and deleting content of the modified portion of the table from the database system and the retaining of the access state flag in the database system.

6. The method of claim 1, wherein the deleting of the content of the portion of the table from the database system is performed by a deletion module of the database system, the method further comprising: controlling the deletion module to delete the portion of the table independent of the access state flag being set or not.

7. The method of claim 1, wherein the creation of a first backup copy is performed by a backup module of the database system, the method further comprising controlling the backup module to include the creating of the first backup copy, and assigning of the portion of the table the access state flag, and the setting of the access state flag as an atomic operation.

8. The method of claim 1, further comprising:
receiving a request to restore the portion of the table;
unsetting the access state flag;
restoring the portion of the table using the third backup copy.

9. A computer program product for archiving a portion of a table residing in a database system, the computer program product comprising a computer readable storage medium having program instructions embodied therewith, wherein the computer readable storage medium is not a transitory signal per se, the program instructions executable by a processor to cause the processor to perform a method comprising:

creating a first backup copy of the portion of the table and assigning a first identifier to the first backup copy using a first identification algorithm;

assigning to the portion of the table an access state flag;

in response to the creation of the first backup copy, setting the access state flag wherein the access state flag is used for preventing modification of the first backup copy of the portion of the table and for preventing further backup operations on the portion of the table after the access state flag is set;

archiving and deleting the content of the portion of the table from the database system and retaining the access state flag in the database system;

determining a second backup copy of the portion of the table was created and assigned a second identifier using a second identification algorithm after the first backup copy was created and before the setting of the access state flag assigned to the portion of the table;

in response to determining that the second backup copy was created, unsetting the access state flag assigned to the portion of the table and creating a third backup copy of the portion of the table using the first backup copy, and assigning a third identifier to the third backup copy using the first identification algorithm; and in response to the creation of the third backup copy, resetting the access state flag assigned to the portion of the table.

10. A database system for archiving a portion of a table residing in the database system, the database system comprising:

a processor; and a computer readable storage medium having program instructions embodied therewith, the program instructions executable by a processor to cause the processor to perform a method comprising:

creating a first backup copy of the portion of the table and assigning a first identifier to the first backup copy using a first identification algorithm;

assigning to the portion of the table an access state flag;

in response to the creation of the first backup copy, setting the access state flag assigned to the portion of the table, wherein the access state flag is used for preventing modification of the first backup copy of the portion of the table and for preventing further backup operations on the portion of the table after the access state flag is set;

archiving and deleting the content of the portion of the table from the database system and retaining the access state flag in the database system;

determining a second backup copy of the portion of the table was created and assigned a second identifier using a second identification algorithm after the first backup copy was created and before the setting of the access state flag assigned to the portion of the table;

in response to determining that the second backup copy was created, unsetting the access state flag assigned to the portion of the table and creating a third backup copy of the portion of the table using the first backup copy, and assigning a third identifier to the third backup copy using the first identification algorithm; and in response to the creation of the third backup copy, resetting the access state flag assigned to the portion of the table.

* * * * *